United States Patent [19]
Dien

[11] Patent Number: 6,112,320
[45] Date of Patent: Aug. 29, 2000

[54] COMPUTER WATCHDOG TIMER

[76] Inventor: Ghing-Hsin Dien, 10F, 148, Sec 2, Fu-Hsing S. Rd., Taipei, Taiwan

[21] Appl. No.: 08/960,312

[22] Filed: Oct. 29, 1997

[51] Int. Cl.[7] .............................. G06F 11/00; H05K 10/00
[52] U.S. Cl. ................................. 714/51; 714/55
[58] Field of Search .................. 714/45, 51, 55, 714/56, 23; 364/267.9

[56] References Cited

U.S. PATENT DOCUMENTS

| | | | |
|---|---|---|---|
| 4,263,647 | 4/1981 | Merrell et al. | 364/101 |
| 4,618,953 | 10/1986 | Daniels et al. | |
| 4,763,296 | 8/1988 | Gercekci | 364/900 |
| 5,233,613 | 8/1993 | Allen et al. | 371/16.3 |
| 5,513,319 | 4/1996 | Finch et al. | 714/55 |
| 5,850,546 | 12/1998 | Kim | 395/651 |

Primary Examiner—Robert W. Beausoliel, Jr.
Assistant Examiner—Pierre Eddy Elisca
Attorney, Agent, or Firm—Henri J. A. Charmasson; John D. Buchaca; William O. Jacobson

[57] ABSTRACT

A watchdog timer for a computer with a CPU and a peripheral controller. The watchdog timer includes a program in the peripheral controller and a corresponding program in the peripheral interrupt service routine of the CPU. When the watchdog timer function is enabled, the peripheral controller will interrupt the CPU periodically and check the response from the CPU. If the CPU is not responding, or wrong data is returned from the CPU, the peripheral controller will generate a reset signal to reset the CPU and reboot the system.

13 Claims, 4 Drawing Sheets

COMPUTER WATCHDOG TIMER

FIELD OF THE INVENTION

The present invention relates to a watchdog timer for a computer, and, in particular, to a personal computer (PC) which has a central processing unit (CPU) and a peripheral controller, which may control, for instance, a keyboard or other peripheral. The peripheral controller interrupts the CPU periodically and sends a watchdog check command to the CPU. When the interrupt service routine of the CPU receives the command, a check data is returned to the peripheral controller. If wrong data is returned or the CPU is not responding at all, the peripheral controller will generate a reset signal to reset the CPU and reboot the system.

BACKGROUND OF THE INVENTION

In the current design of the typical personal computer, there is no watchdog timer to monitor the operation of the CPU. A watchdog timer is needed to monitor the CPU and to reset the CPU when it is in a run-away mode or halted for unknown reasons.

Current watchdog timers, as are well known in the prior art, consist of a hardware circuit which must be added to the computer, which consists of a timer which must be reset by the CPU periodically to prevent it from overflowing and generating a reset to the system. All application programs running on the system must start the timer running, and then reset the timer periodically. Both the timer start and reset must be done in each application program. Since there are various designs of watchdog timer circuits for personal computers, application developers have to design programs to interface with various designs of watchdog timers.

SUMMARY OF THE INVENTION

In the present invention, a watchdog timer is built in the personal computer by utilizing the current structure of the typical PC. It is not necessary to make any hardware modifications to the PC, and, more significantly, it is not necessary to modify the application programs to interface with the watchdog timer.

In a typical modern personal computer, the CPU and peripheral controllers, are coupled together and communicate via a system bus. The peripheral controllers typically have an output pin which is connected to the CPU's interrupt controller, and another output pin which is connected to the CPU's reset circuit. The peripheral controller can interrupt the CPU through the interrupt line, and, in response, the CPU will enter the interrupt service routine for that particular peripheral controller, reading and sending data to the controller through the system bus. The peripheral controller also can reset the CPU and reboot the system through its output pin connected to the CPU reset circuit.

In the present invention, a watchdog program is added to the peripheral controller's micro-code program, and a watchdog service routine is added to the CPU's peripheral interrupt service routine. When the watchdog timer function is enabled, the watchdog program in the controller will interrupt the CPU periodically and send a predefined watchdog check command to the CPU. When the interrupt service routine of the CPU receives the watchdog check command, the watchdog service routine will return a set of watchdog check data to the peripheral controller, which may, for example, include the CPU's execution counters or other program counters. The peripheral controller will check the data and decide whether the CPU and system is running normally, or if the CPU is in a run-away mode and unable to respond. If such a condition is detected, the peripheral controller will generate a reset signal on it's output pin to reset the CPU and reboot the system.

The watchdog timer function of the present invention can be enabled or disabled in the BIOS setup program of the personal computer. Thus, the watchdog timer can start to operate even before the disk operating system (DOS) is loaded into system, and there is no need to modify the application program to have the watchdog timer running.

DETAILED DESCRIPTION OF THE PREFERRED EMBODIMENT

Figure 1:
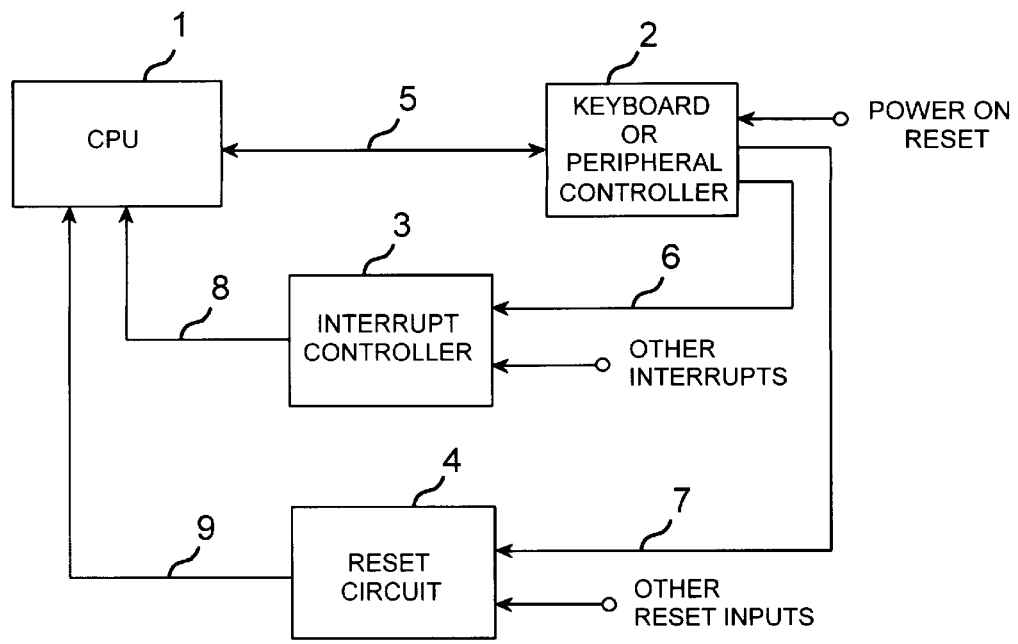
FIG. 1 shows the block diagram of the CPU and the peripheral controller of personal computers.

As shown in FIG. 1, the watchdog timer of the present invention comprises CPU 1 and peripheral controller 2. CPU 1 is connected to peripheral controller 2 via system bus 5. Peripheral controller 2 has interrupt output 6 connected to interrupt controller 3 of CPU 1 and reset output 7 connected to reset circuit 4 of CPU 1. The output of interrupt controller 3 is connected to interrupt input 8 of CPU 1, and the output of reset circuit 4 is connected to reset input 9 of CPU 1. Peripheral controller 2 can interrupt CPU 1 through interrupt output 6, and reset CPU 1 to reboot the system through reset output 7. A watchdog program is installed in the micro code program of peripheral controller 2, and a watchdog service routine is installed in the peripheral interrupt service routine of CPU 1.

When the watchdog function is enabled, the watchdog program in peripheral controller 2 will send a watchdog check command to CPU 1 and interrupt CPU 1 periodically through interrupt output 6. When CPU 1 receives the interrupt, and the interrupt service routine of CPU 1 receives the watchdog check command from peripheral controller 2 through system bus 5, the watchdog interrupt service routine of CPU 1 must return a set of watchdog check data to peripheral controller 2. The set of watchdog check data may include, for example, the execution counter or other program counters of CPU 1 as updated by other running programs in the system. By examining the counter values, the watchdog program in peripheral controller 2 decides whether the CPU and the system is running normally or not. If an abnormal condition is found, or if the CPU is halted for some unknown reason and not responding at all, the watchdog program in peripheral controller 2 will generate a reset on output 7 to reset CPU 1 and reboot the system.

Figure 3:
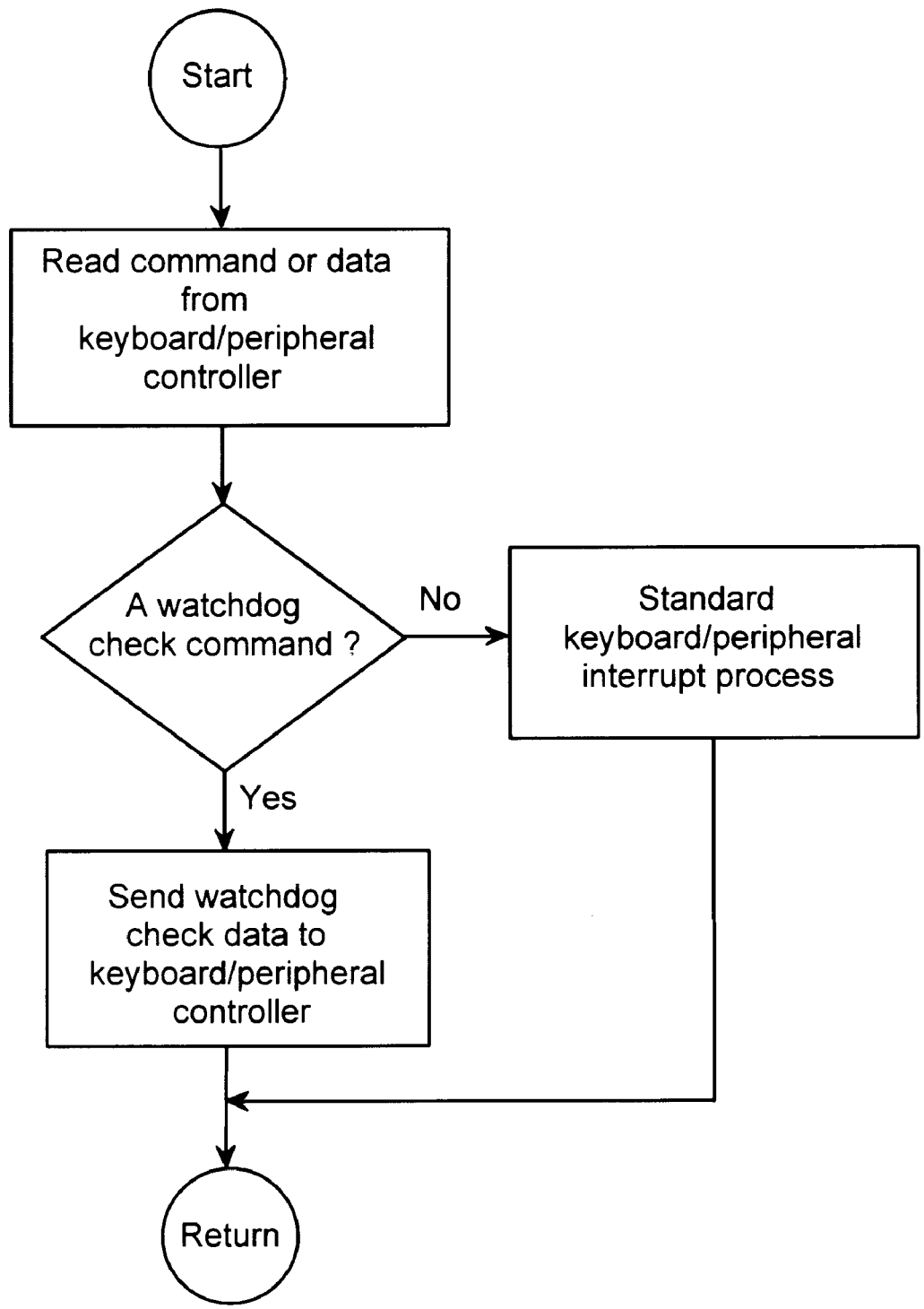
FIG. 3 shows the software flowchart of the peripheral interrupt service routine executed by the CPU in which a watchdog service routine is added to return the watchdog check data to the peripheral controller when interrupted.
Figure 4:
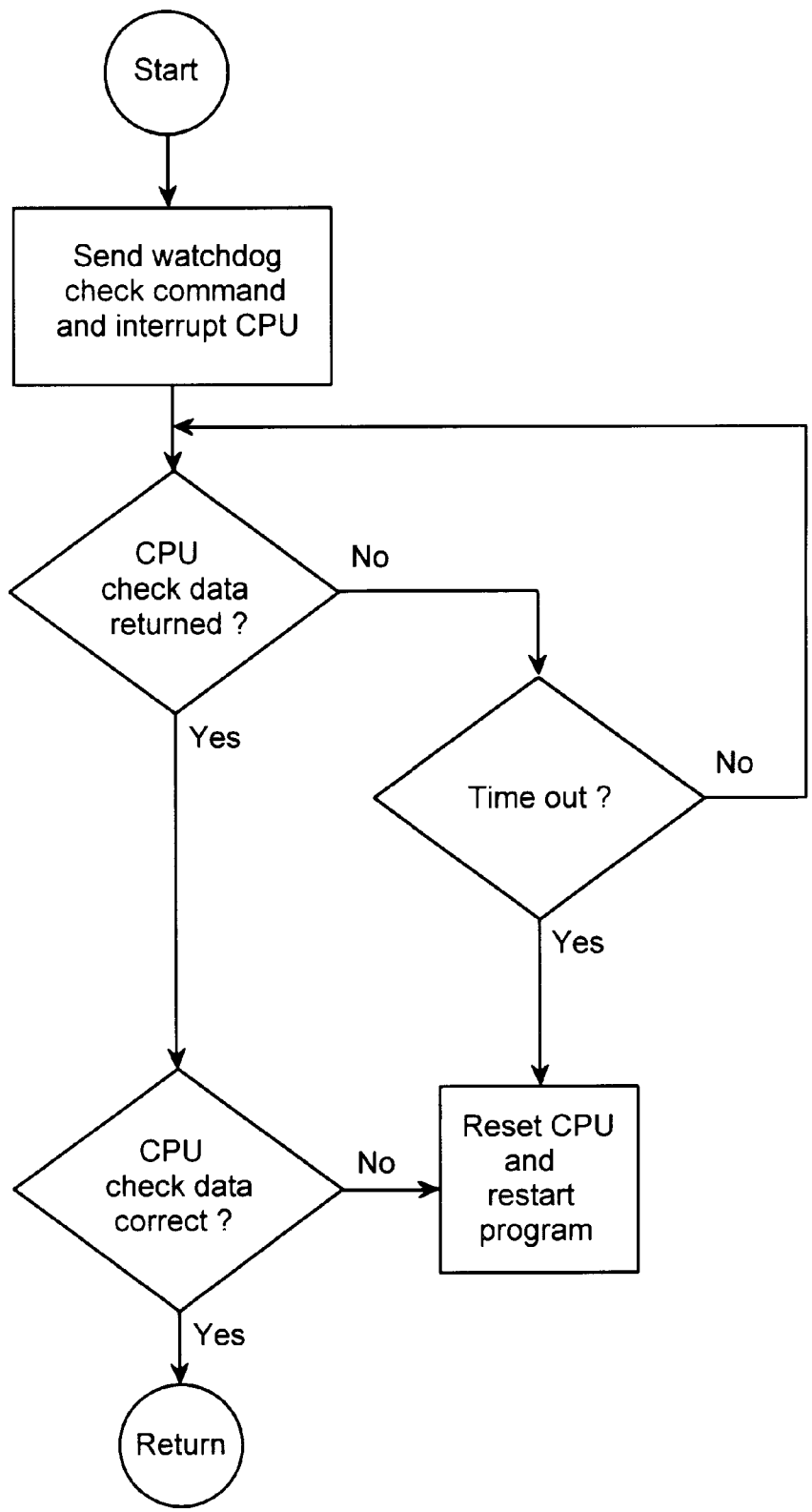
FIG. 4 shows the software flowchart of the watchdog program executed periodically by the peripheral controller to check the status of the CPU and reset the CPU when an abnormality is detected.

FIG. 3. Shows a logic flow diagram of the watchdog service routine of CPU 1 and FIG. 4 shows a logic flow diagram of the watchdog program installed in the microcode of peripheral controller 2.

Figure 2:
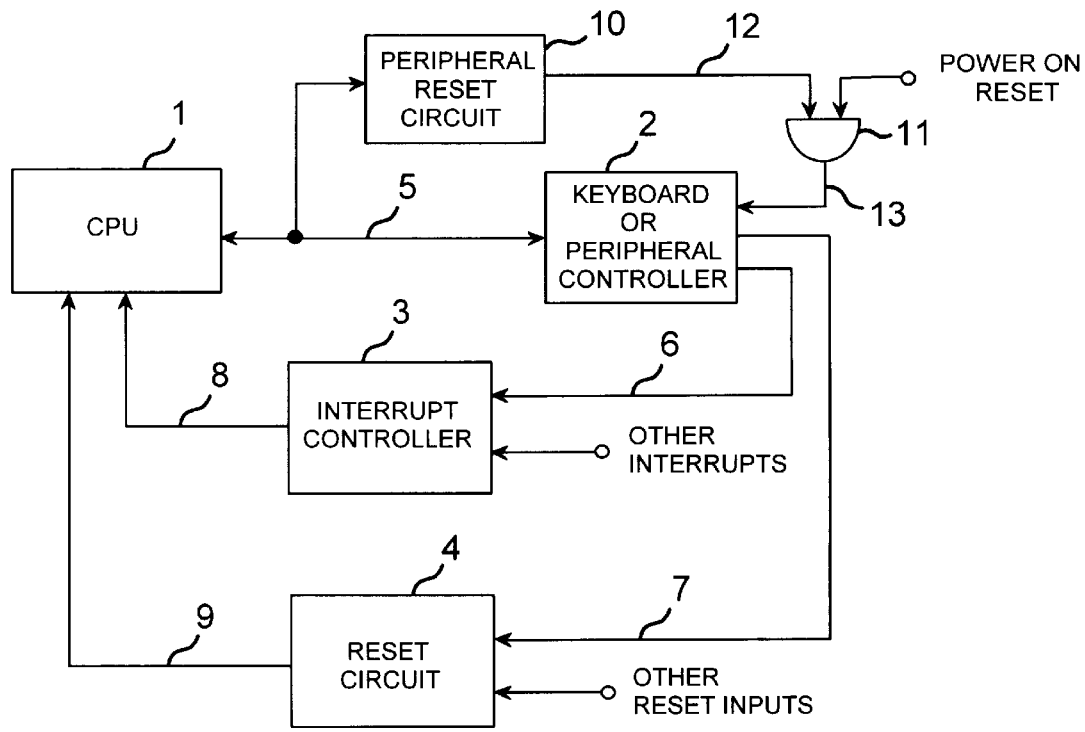
FIG. 2 shows the block diagram of an advanced design of the present invention in which a peripheral reset circuit is added.

FIG. 2 is a more advanced design of the present invention. Peripheral reset circuit 10 is connected to system bus 5, and output 12 of peripheral reset circuit 10 is logically OR'd with the power-on reset by gate 11. The output of gate 11 is connected to reset input 13 of peripheral controller 2. In the design of FIG. 2, in addition to the functionality described above with respect to the design of FIG. 1, CPU 1 also is capable of checking the status of peripheral controller 2 by periodically sending a check command to peripheral controller 2 and checking the response which is received therefrom. If peripheral controller 2 is not responding normally or has no response at all, CPU 1 can write to peripheral reset circuit 10, which in turn will generate a reset signal to reset peripheral controller 2. This configuration enables a double watchdog timer check in the computer, allowing peripheral controller 2 and CPU 1 to periodically check on each other.

Figure 5:
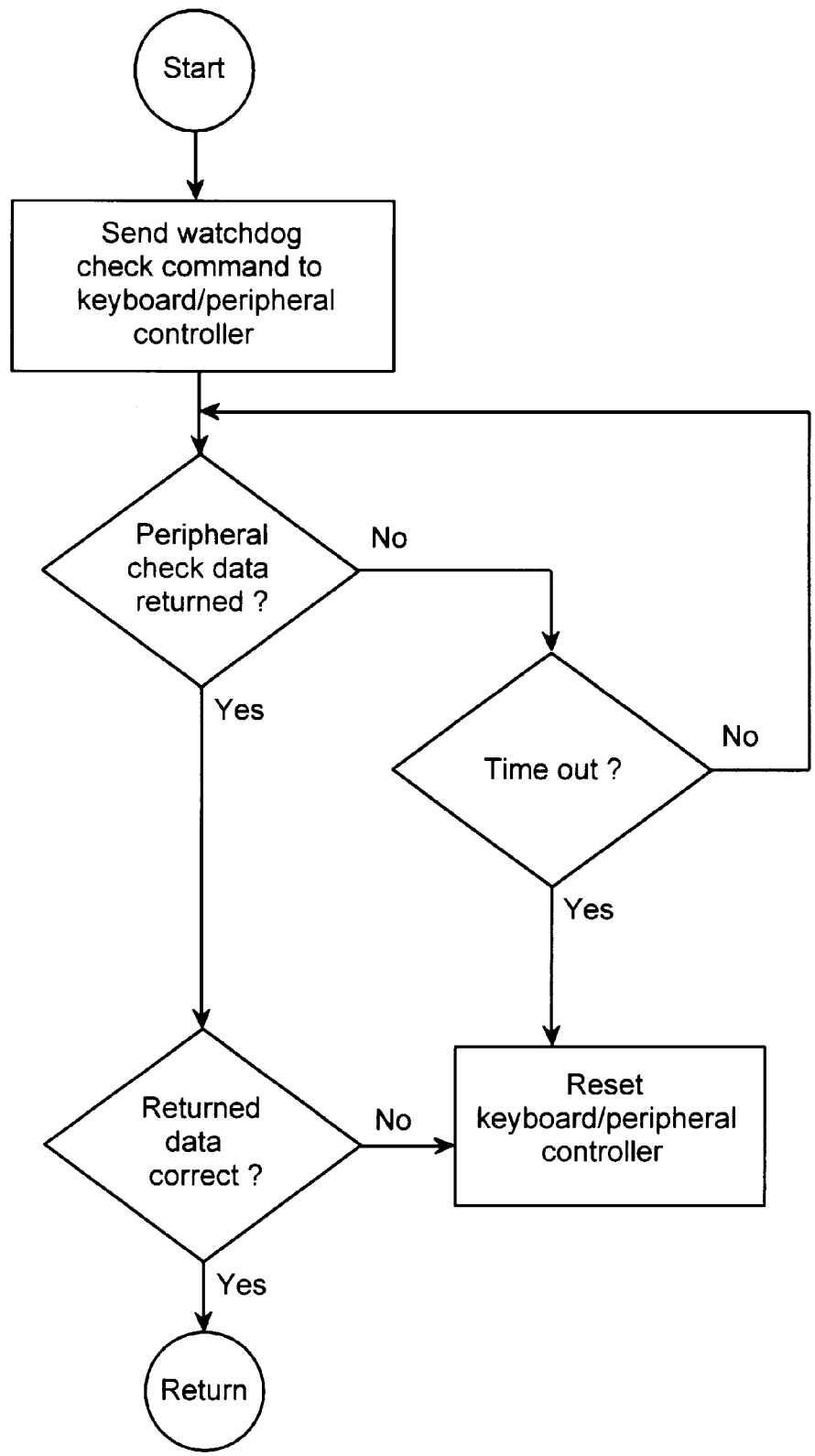
FIG. 5 shows the software flowchart of the watchdog program executed periodically by the CPU to check the status of the peripheral controller and reset the peripheral controller when an abnormality is detected.

FIG. 5 show a logic flow diagram of the watchdog program of CPU 1 in the more advanced design.

Although the invention has been described in detail in the foregoing for the purpose of illustration only, it is understood that such detail is solely for that purpose and that variations can be made therein by those of ordinary skill in the art without departing from the spirit and scope of the invention, as defined by the following claims, including all equivalents thereof.

I claim:

1. A watchdog timer for a computer having a central processing unit and a peripheral controller comprising:

a. a watchdog program, executing on a micro-code program on said peripheral controller, which periodically interrupts and sends a watchdog check command to said central processing unit of said computer; and b. a watchdog interrupt service routine, executing on said central processing unit of said computer, which responds to said interrupt and said watchdog check command with a predefined response;

wherein said peripheral controller and watchdog program can reset said computer if said predefined response is not received from said watchdog interrupt service routine executing on said central processing unit of said computer.

2. The watchdog timer of claim 1 wherein said central processing unit and said peripheral controller are coupled via a communications bus and wherein said watchdog check command and said predefined response are communicated over said bus.

3. The watchdog timer of claim 1 wherein said peripheral controller has an interrupt output and said central processing unit has an interrupt input and wherein said interrupt output of said peripheral controller is coupled to said interrupt input of said central processing unit.

4. The watchdog timer of claim 1 wherein said peripheral controller has a reset output and said central processing unit has a reset input and wherein said reset output of said peripheral controller is coupled to said reset input of said central processing unit.

5. The watchdog timer of claim 1 further comprising a timeout function wherein said watchdog program resets said computer if said predetermined response is not received from said central processing unit of said computer within a predetermined time period.

6. The watchdog timer of claim 1 wherein said watchdog program can be disabled.

7. The watchdog timer of claim 1 further comprising a second watchdog program, executing on said central processing unit of said computer, which periodically sends a watchdog peripheral check command to said watchdog program executing on said peripheral controller, wherein said watchdog program executing on said peripheral controller responds to said watchdog peripheral check command with a predetermined response and wherein said second watchdog program executing on said central processing unit of said computer can reset said peripheral controller if said response is not received from said watchdog program executing on said peripheral controller.

8. The watchdog timer of claim 7 wherein said central processing unit and said peripheral controller are coupled via a communications bus and wherein said watchdog check command and said predefined response are communicated over said bus.

9. The watchdog timer of claim 7 wherein said peripheral controller has an interrupt output and said central processing unit has an interrupt input and wherein said interrupt output of said peripheral controller is coupled to said interrupt input of said central processing unit.

10. The watchdog timer of claim 7 wherein said peripheral controller has a reset output and said central processing unit has a reset input and wherein said reset output of said peripheral controller is coupled to said reset input of said central processing unit.

11. The watchdog timer of claim 7 further comprising a timeout function wherein said watchdog program resets said computer if said predetermined response is not received from said central processing unit of said computer within a predetermined time period.

12. The watchdog timer of claim 7 further comprising a timeout function wherein said second watchdog program resets said peripheral controller if said predetermined response is not received from said peripheral controller with a predetermined time period.

13. The watchdog timer of claim 7 wherein said watchdog program and said second watchdog program can be disabled.

* * * * *